(12) United States Patent
Gwizdaloski

(10) Patent No.: US 7,552,108 B2
(45) Date of Patent: Jun. 23, 2009

(54) SYSTEM AND METHOD FOR MULTICOLUMN SORTING IN A SINGLE COLUMN

(75) Inventor: Joseph P. Gwizdaloski, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/601,198

(22) Filed: Nov. 17, 2006

(65) Prior Publication Data

US 2007/0083515 A1   Apr. 12, 2007

Related U.S. Application Data

(62) Division of application No. 10/325,715, filed on Dec. 20, 2002, now Pat. No. 7,203,694.

(51) Int. Cl.
*G06F 7/00* (2006.01)
(52) U.S. Cl. .................... 707/2; 707/7; 707/100
(58) Field of Classification Search .............. 707/2–7
See application file for complete search history.

(56) References Cited

U.S. PATENT DOCUMENTS

| | | | | |
|---|---|---|---|---|
| 5,274,805 | A | 12/1993 | Ferguson et al. | 395/600 |
| 5,396,621 | A | 3/1995 | MacGregor et al. | 395/161 |
| 5,490,269 | A | 2/1996 | Cohn et al. | 395/600 |
| 5,553,218 | A * | 9/1996 | Li et al. | 707/102 |
| 5,729,732 | A | 3/1998 | Gal et al. | 395/607 |
| 5,745,891 | A | 4/1998 | Minakuchi et al. | 707/3 |
| 5,812,840 | A * | 9/1998 | Shwartz | 707/4 |
| 5,899,988 | A | 5/1999 | Depledge et al. | 707/3 |
| 5,926,807 | A * | 7/1999 | Peltonen et al. | 707/4 |
| 6,029,163 | A * | 2/2000 | Ziauddin | 707/2 |
| 6,052,683 | A | 4/2000 | Irwin | 707/8 |
| 6,185,557 | B1 | 2/2001 | Liu | 707/4 |
| 6,205,453 | B1 | 3/2001 | Tucker et al. | 707/503 |
| 6,397,204 | B1 * | 5/2002 | Liu et al. | 707/2 |
| 6,446,063 | B1 * | 9/2002 | Chen et al. | 707/4 |
| 6,553,383 | B1 * | 4/2003 | Martin | 707/102 |

(Continued)

FOREIGN PATENT DOCUMENTS

JP   10320411 A   6/2001

OTHER PUBLICATIONS

Multiple-column sorting controls. Research Disclosure 442152, Feb. 2001, pp. 319-320.

(Continued)

*Primary Examiner*—Mohammad Ali
*Assistant Examiner*—Jessica N Le
(74) *Attorney, Agent, or Firm*—Schmeiser, Olsen & Watts; William E. Schiesser

(57) ABSTRACT

A system for multicolumn ordering includes a processor and a data store. The data store stores a table including a plurality of category and data columns. The processor applies key prefixes to column data values of a plurality of the data columns to form and store in the data store a set of prefixed data values. The processor then orders the set of prefixed data values in a first compound column and one or more category columns in a second compound column and responsive to the first and second compound columns selects and stores a subset for further processing.

6 Claims, 15 Drawing Sheets

U.S. PATENT DOCUMENTS

| | | | | |
|---|---|---|---|---|
| 6,564,204 | B1 | 5/2003 | Amundsen et al. | 707/2 |
| 6,662,175 | B1 * | 12/2003 | Ghazal et al. | 707/2 |
| 6,738,770 | B2 | 5/2004 | Gorman | 707/7 |
| 6,745,173 | B1 | 6/2004 | Amundsen | 707/2 |
| 6,778,651 | B1 * | 8/2004 | Jost et al. | 379/201.01 |
| 6,801,915 | B1 * | 10/2004 | Mack | 707/100 |
| 7,103,596 | B2 * | 9/2006 | Abe et al. | 707/7 |
| 2001/0016855 | A1 | 8/2001 | Hiroshige | 707/503 |

OTHER PUBLICATIONS

Multi-column sorting algorithm. Research Disclosure 449161, Sep. 2001, p. 1609.

Highly controllable and visible inline multi-column sorting controls. Research Disclosure 437130, Sep. 2000, pp. 1708-1710.

* cited by examiner

| DOC REF # | OWNER | # ITEMS | CREATE DATE | $ AMOUNT | FIRST SUPPLIER | FIRST ITEM |
|---|---|---|---|---|---|---|
| 1 | TED | 4 | 01 | 44 | A | V |
| 1 | SAM | 4 | 01 | 44 | A | V |
| 2 | TED | 20 | 01 | 100 | A | V |
| 2 | SAM | 20 | 01 | 100 | A | V |
| 3 | SAM | 14 | 01 | 25 | B | V |
| 3 | BILL | 14 | 01 | 25 | B | V |
| 4 | TED | 22 | 02 | 20 | B | V |
| 4 | SAM | 22 | 02 | 20 | B | V |
| 5 | AL | 36 | 04 | 360 | C | W |
| 5 | BILL | 36 | 04 | 360 | C | W |
| 6 | BILL | 7 | 04 | 45 | A | X |
| 7 | CARL | 13 | 05 | 417 | D | X |
| 7 | SAM | 13 | 05 | 417 | D | X |
| 8 | PHIL | 22 | 05 | 14 | D | V |
| 8 | SAM | 22 | 05 | 14 | D | V |
| 9 | SAM | 15 | 05 | 500 | D | W |
| 9 | BILL | 15 | 05 | 500 | D | W |
| 10 | TED | 43 | 06 | 49 | F | Y |
| 10 | SAM | 43 | 06 | 49 | F | Y |
| ⋮ | | | | | | |
| 26 | CARL | 68 | 26 | 18 | C | Z |
| 26 | SAM | 68 | 26 | 18 | C | Z |
| 27 | TED | 14 | 26 | 15 | B | Z |
| 27 | SAM | 14 | 26 | 15 | B | Z |
| ⋮ | | | | | | |

FIG. 3

| OWNER | DATA |
|---|---|
| AL | 01:C |
| AL | 01:C |
| AL | 02:043 |
| AL | 02:360 |
| AL | 03:V |
| AL | 03:W |
| BILL | 01:A |
| BILL | 01:A |
| BILL | 01:A |
| BILL | 01:A |
| BILL | 01:A |
| BILL | 01:A |
| BILL | 01:B |
| BILL | 01:B |
| BILL | 01:C |
| BILL | 01:C |
| BILL | 01:C |
| BILL | 01:C |
| BILL | 01:D |
| BILL | 01:D |
| BILL | 01:F |
| BILL | 02:014 |
| BILL | 02:019 |
| BILL | 02:023 |
| BILL | 02:025 |
| BILL | 02:029 |
| BILL | 02:043 |
| BILL | 02:045 |
| BILL | 02:045 |
| BILL | 02:047 |
| BILL | 02:072 |
| BILL | 02:076 |
| BILL | 02:084 |
| BILL | 02:270 |
| BILL | 02:360 |
| BILL | 02:500 |
| BILL | 03:U |
| BILL | 03:U |
| BILL | 03:U |
| BILL | 03:U |
| BILL | 03:V |
| BILL | 03:V |
| BILL | 03:W |
| BILL | 03:W |
| BILL | 03:W |
| BILL | 03:W |
| BILL | 03:X |
| BILL | 03:X |
| BILL | 03:Y |
| BILL | 03:Z |
| BILL | 03:Z |
| CARL | 01:A |
| CARL | 01:C |
| CARL | 02:047 |
| CARL | 02:270 |
| CARL | 03:U |
| CARL | 03:W |
| ... | ... |
| TED | 01:F |
| TED | 02:072 |
| TED | 03:Y |
| ... | ... |

FIG. 5

| PRIMARY KEY (62) | # ITEMS (50) | CREATE DATE 200202 (52) | $ AMOUNT (54) | FIRST SUPPLIER (56) | FIRST ITEM (58) |
|---|---|---|---|---|---|
| BILL | 15 | 05 | 500 | D | W |
| BILL | 36 | 04 | 360 | C | W |
| BILL | 12 | 28 | 270 | C | W |
| BILL | 12 | 27 | 084 | A | U |
| BILL | 14 | 27 | 076 | A | U |
| BILL | 92 | 07 | 072 | F | Y |
| BILL | 17 | 22 | 047 | A | U |
| BILL | 7 | 04 | 045 | A | X |
| BILL | 14 | 07 | 045 | A | X |
| BILL | 22 | 22 | 043 | C | V |
| BILL | 91 | 26 | 029 | D | W |
| BILL | 14 | 01 | 025 | B | V |
| BILL | 4 | 21 | 023 | A | U |
| BILL | 36 | 10 | 019 | C | Z |
| BILL | 42 | 30 | 014 | B | Z |

FIG. 8

|  OWNER  |  DATA       |
|---------|-------------|
|  BILL   |  01 : A 023 |
|  BILL   |  01 : A 045 |
|  BILL   |  01 : A 045 |
|  BILL   |  01 : A 047 |
|  BILL   |  01 : A 076 |
|  BILL   |  01 : A 084 |
|  BILL   |  03 : U     |
|  BILL   |  03 : U     |
|  BILL   |  03 : U     |
|  BILL   |  03 : U     |
|  BILL   |  03 : V     |
|  BILL   |  03 : V     |
|  BILL   |  03 : W     |
|  BILL   |  03 : W     |
|  BILL   |  03 : W     |
|  BILL   |  03 : W     |
|  BILL   |  03 : X     |
|  BILL   |  03 : X     |
|  BILL   |  03 : Y     |
|  BILL   |  03 : Z     |
|  BILL   |  03 : Z     |
|  ...    |  ...        |

FIG. 10

SYSTEM AND METHOD FOR MULTICOLUMN SORTING IN A SINGLE COLUMN

This application is a divisional of U.S. patent application Ser. No. 10/325,715 filed 20 Dec. 2002 now U.S. Pat. No. 7,203,694 by Joseph P. Gwizdaloski for System and Method for Multicolumn Sorting In A Single Column.

BACKGROUND OF THE INVENTION

1. Technical Field of the Invention

This invention relates to sorting technology. More particularly, it relates to multicolumn sorting in one column.

2. Background Art

The IBM Lotus Notes™ program currently provides a multiple column sort capability for non-restricted document views. Views are dynamically changing windows in a Notes database for organizing and locating documents. When the view is embedded and restricted by category, then the multiple column sort capability is unavailable. In Notes, an embedded object, such as a view, is an object that becomes part of a Notes document.

One approach to providing multiple column sort capability in embedded views restricted by category is with the use of multiple Notes views, at the cost of large overhead on the system for maintaining these multiple Notes views. Maintenance cost increases when servicing or updating multiple views. Another approach is to sort data inline with every query request. There is a need, therefore, to provide improved server performance, by providing multicolumn sort capability with fewer views while avoiding having to sort data inline with every query request.

It is an object of the invention to provide an improved system and method for sorting on multiple columns when multiple column sort capability is not available or efficient.

SUMMARY OF THE INVENTION

A system and method for multicolumn ordering by applying key prefixes to column data values of a plurality of data columns to form a set of prefixed data values; ordering the set of prefixed data values in a first compound column; and selecting from that ordered set a subset for further processing.

In accordance with an aspect of the invention, there is provided a computer program product configured to be operable for ordering in a single column a table having a plurality of category and data columns by use of column key prefixes on column values.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a view of the document table of FIG. 2, with the category columns 41 and 43 combined into an owner column 42.

FIG. 5 illustrates a specialized view of the table of FIG. 2 with two sorted compound fields (owner and data) in accordance with the preferred embodiment of the invention.

FIG. 8 illustrates an embedded view derived from the embedded view of FIG. 4 showing the amount column sorted in descending order in accordance with the preferred embodiment of the invention.

FIG. 10 illustrates a specialized view showing concatenated data fields for nested sorting.

DETAILED DESCRIPTION OF PREFERRED EMBODIMENTS

In accordance with the preferred system and method of the invention, multicolumn ordering is accomplished in a single column by use of column key prefixes on column values.

Exemplary embodiments of the invention draw upon the methods of the IBM Lotus Notes™ program.

Figures 1, 2:
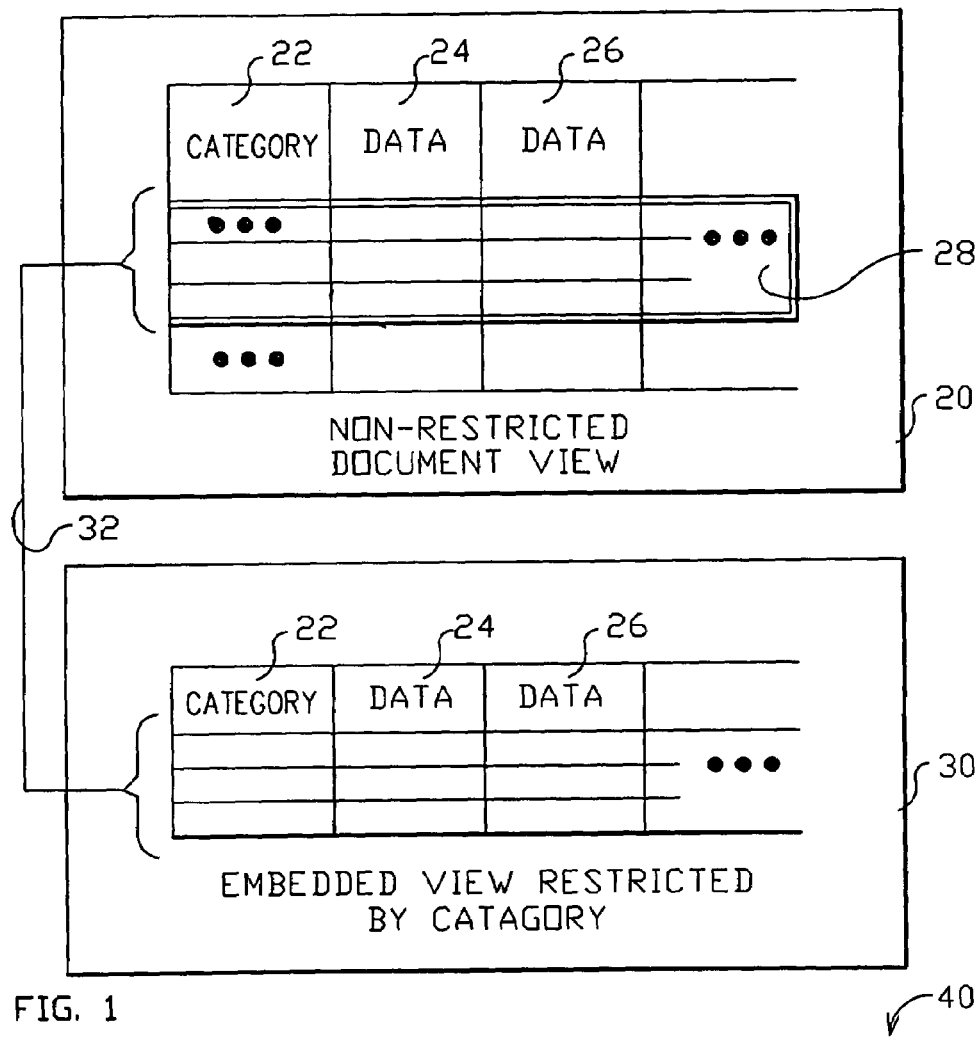
FIG. 1 is a diagrammatic view illustrating an embedded subsetted view restricted by category within the view framework of Notes.
FIG. 2 illustrates the format of a portion of a Notes document table including category columns requester 41 and initiator 43 and a plurality of data columns 50-58.

Referring to FIG. 1, a diagrammatic view illustrates an embedded subsetted view 30 within the view framework of Notes restricted by category. Non-restricted document view 20 includes category 22 and data columns 24, 26. In the prior art, when selecting portion 28 restricted to a specific category 22 for display in embedded view 30, the ability to sort data on columns 24 or 26 is lost. In accordance with the present invention, data columns 24 and/or 26 may be sorted in ascending or descending mode.

Referring to FIG. 2, the format of a portion of a Notes document table 40 is illustrated including category columns requester 41 and initiator 43, document reference number column 44, and a plurality of data columns including number of items 50, creation date 52, dollar amount 54, first supplier 56, and first item 58.

Referring to FIG. 3, a modified view of Notes document table 40 illustrates a table of data for a collection of Notes documents, in which the requester 41 and initiator 43 columns have been combined into an owner column 42, and data columns including document reference number 44, number of items 50, creation date 52, dollar amount 54, first supplier 56 and first item 58. In this example, Bill is both requester 41 and initiator 43 of document reference number 6, and the requester 41 and initiator 43 are different for the other illustrated entries in table 40.

Figure 4:
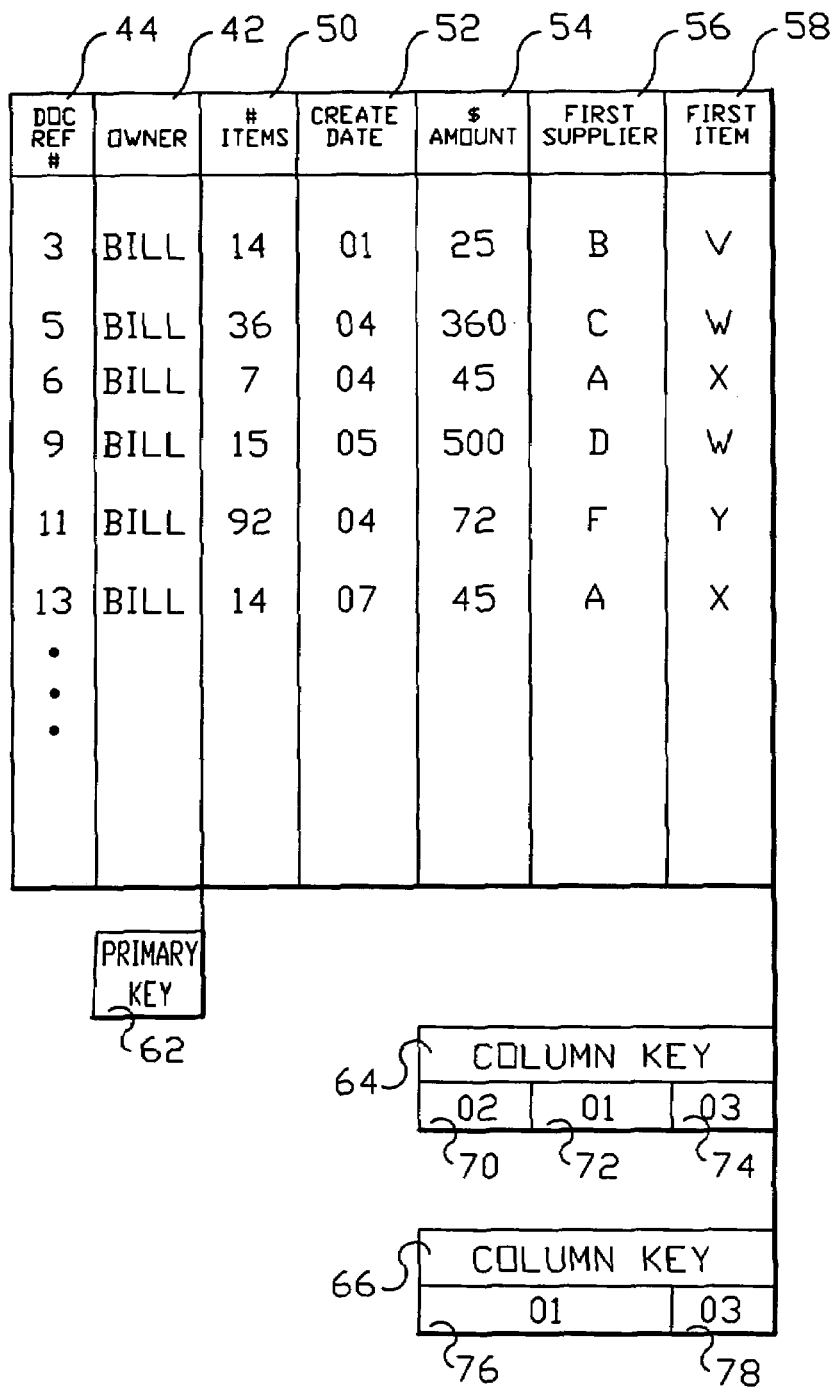
FIG. 4 illustrates a subsetted view of the table of FIG. 3 restricted to Bill as owner (either requester or initiator).

Referring to FIG. 4, a subsetted view of the table of FIG. 3 is illustrated which is restricted to include only rows or entries in which Bill is the owner 42 (that is, either requester 41 or initiator 43). Primary key 62 and column keys 64, 66 will be described hereafter in connection with sorting and nested sorting, respectively.

Referring to FIG. 5, a specialized view 80 of the table of FIG. 2 is illustrated with two sorted compound fields (owner 42 and data 84) in accordance with the preferred embodiment of the invention.

In order to provide the ability to sort on several columns 41-58 in a Notes view, including at least one restricting column 41, 43 and a plurality of data columns 50-58, a first sorted compound column (herein, owner 42) is created from the restricting columns 41, 43 and a second sorted compound column 84 is created from the data columns 50-58 and prefix data, or column keys, 64.

Figure 6:
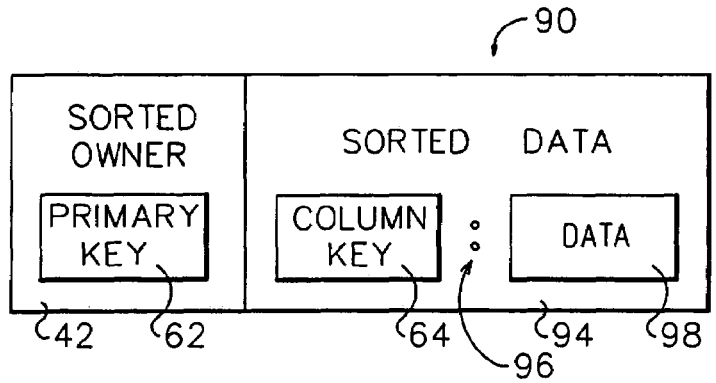
FIG. 6 is a diagrammatic illustration of the format of a row entry in the specialized view of the table of FIG. 5.

Referring to FIG. 6, the format of a row entry 90 in the specialized view of the table of FIG. 5 is shown. A first compound column 42 is sorted on primary key 62 which, in the example of FIG. 4, includes owner column 42. A second compound column 94 is sorted on column key 64, including prefix values 70-74 and corresponding data columns 54-58, as will be illustrated hereafter. Referring to FIG. 5, before sorting the second compound column 84, a key 64 (preferably in character format) is prefixed to each data value 98, which key identifies the specific data column 54-58 for that data value. Since the prefix is character in format, the data values 54-58 are converted to some appropriate character representation to ensure proper sorting. In this manner, a date column may be formatted as year, month and day, or YYYYMMDD. Number values would be left padded to represent the integer values by numbers of an appropriate length for proper ordering (so that 002 comes before 010, else 2 would come after 10 based on a comparison of first characters). A key/data delimiter, such as colon ":" 96, is inserted between column key 64 and data value 98.

View 80 is defined to 'show multiple values as separate entries'. So that instead of one document record in the view with six item column values, there are six separate document records with single values in a sorted second column 84.

The resulting view 80 shows a first column 42 that is sorted by owner (requester 41 or initiator 43), and a second column 84 that is sorted by data type 70, 72, 74 first and within data type by the value 98 of the data type. In this manner, for a table of N data columns 54-58 (those data columns selected for sort from a table which may include many more data columns, such as columns 50 and 52), N different sorts are combined into one column 84. In the example of FIGS. 4 and 5, N=3.

Figure 7:
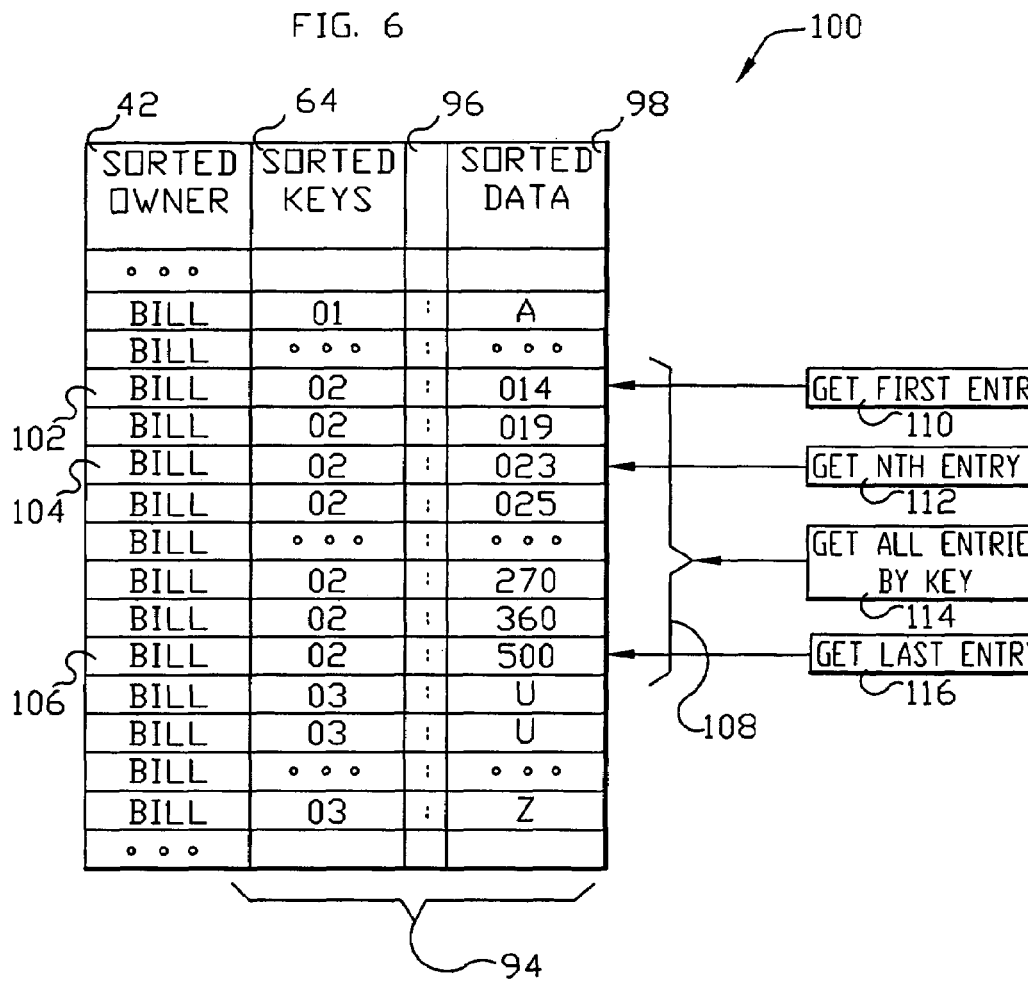
FIG. 7 illustrates a portion of the specialized view of FIG. 5 selected to show the application of Notes methods: GetFirstEntry, GetNthEntry, GetAllEntriesByKey, and GetLastEntry.

Referring to FIG. 7, a portion of the specialized view of FIG. 5 is selected to show the application of Notes methods: GetFirstEntry 110, GetNthEntry 112, GetAllEntriesByKey 114, and GetLastEntry 116.

For example, view 80 is opened by a Notes Agent to execute GetAllEntriesByKey 114. As input to this request, the owner name 42 is the first key 62 to match on, and the second key is the prefix value 64 so that the second column 84 is matched (not an exact match) on just the prefix 64. This process extracts from view 80 a unique set of documents that are sorted as illustrated by view 100 by the compound value prefix|data 64|98.

Referring to FIG. 8, an embedded view 120 derived from the embedded view of FIG. 4 shows the amount column 54 sorted in descending order in accordance with the preferred embodiment of the invention.

The above described GetAllEntriesByKey method 114 results in a NotesViewEntryCollection which includes a count property that yields the number of documents in the result set 120. (In this example, there are 15 rows, and the count property is 15.) A NotesViewEntryCollection represents a collection of view entries of type document sorted in view order.

GetFirstEntry 110, GetLastEntry 116, GetNextEntry, GetNthEntry 112 and GetPrevEntry methods allow navigation to a set of documents 108 that are of interest. Since the document set is ordered (as illustrated from rows 102 through 106 of FIG. 7), they are sorted in the same order, either ascending or descending, and these methods and the count property provide sufficient tools to identify the set of documents from either the top 102 of the list or the bottom 106 for posting as view 120 back to the user.

Figure 9:
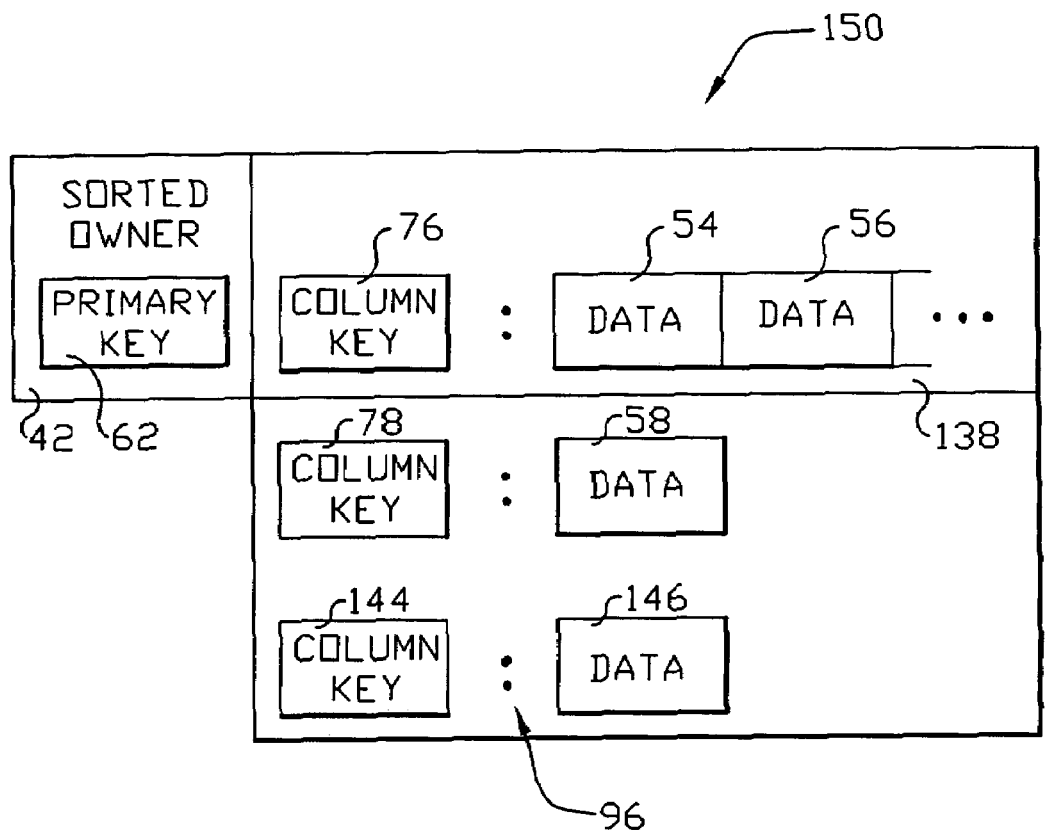
FIG. 9 is a diagrammatic illustration of formats of row entries in the specialized view of FIG. 10, illustrating concatenation of data fields for nested sorting in accordance with an alternative embodiment of the invention.
Figure 11:
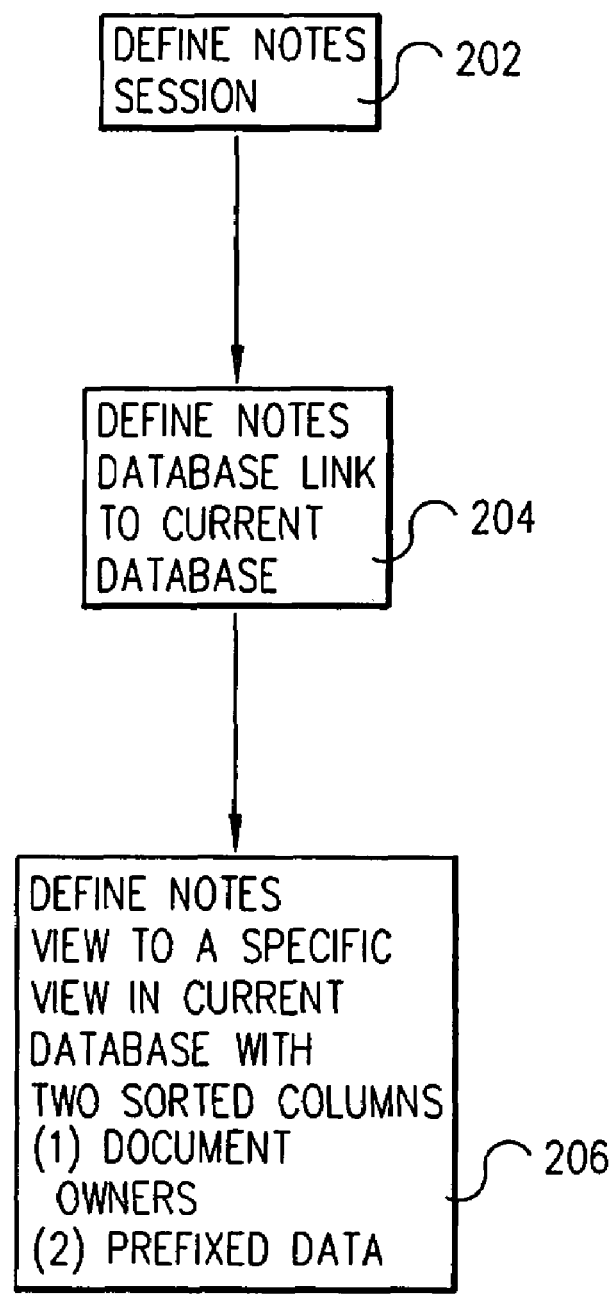
FIG. 11 is a flow chart representation of the initialization steps of an illustrative embodiment of the invention.
Figure 12A:
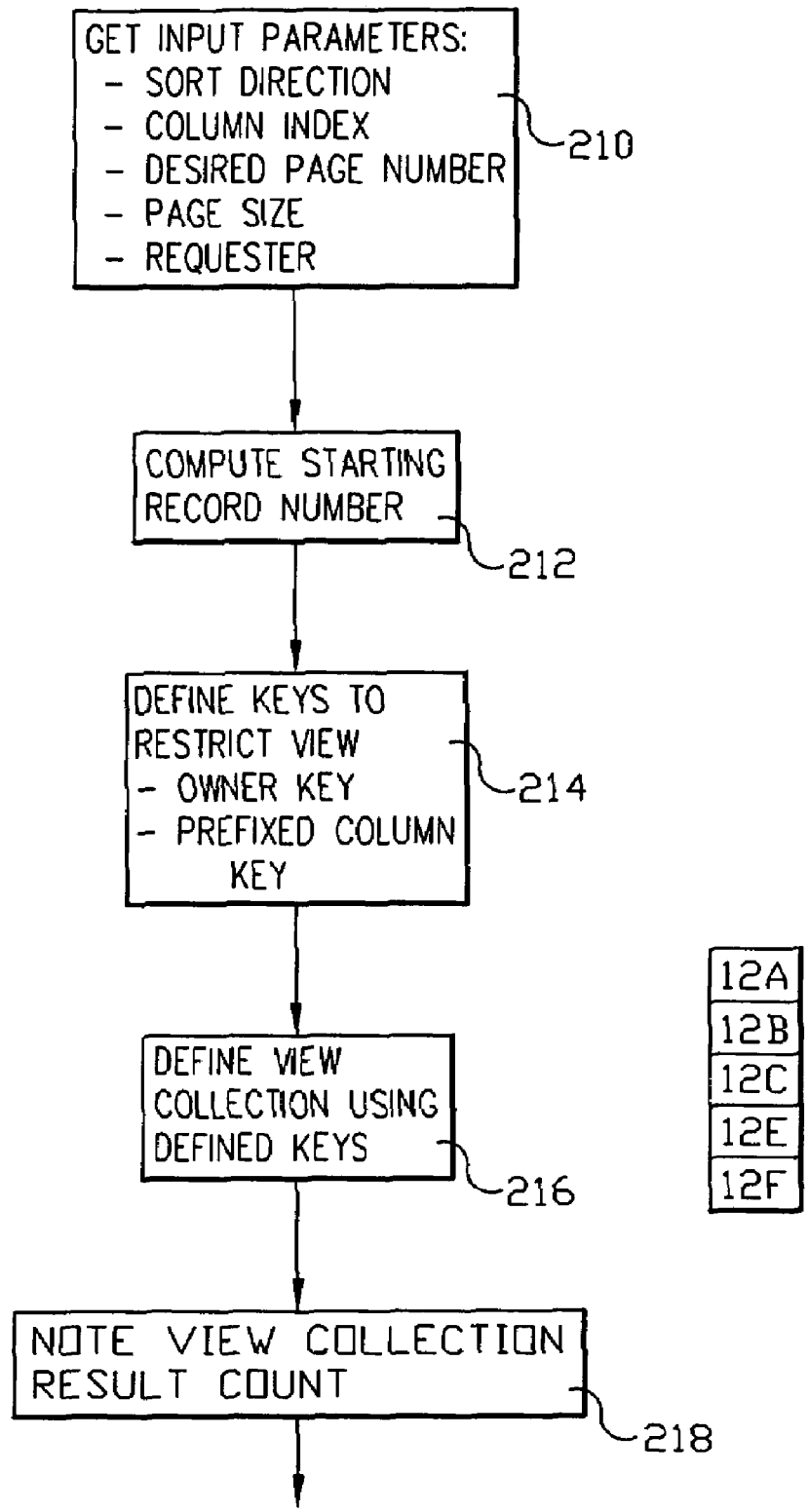
FIGS. 12A through 12F are a flow chart representation of an illustrative embodiment of the invention for collecting into local arrays column sorted data for presentation in an embedded view.
Figure 12B:
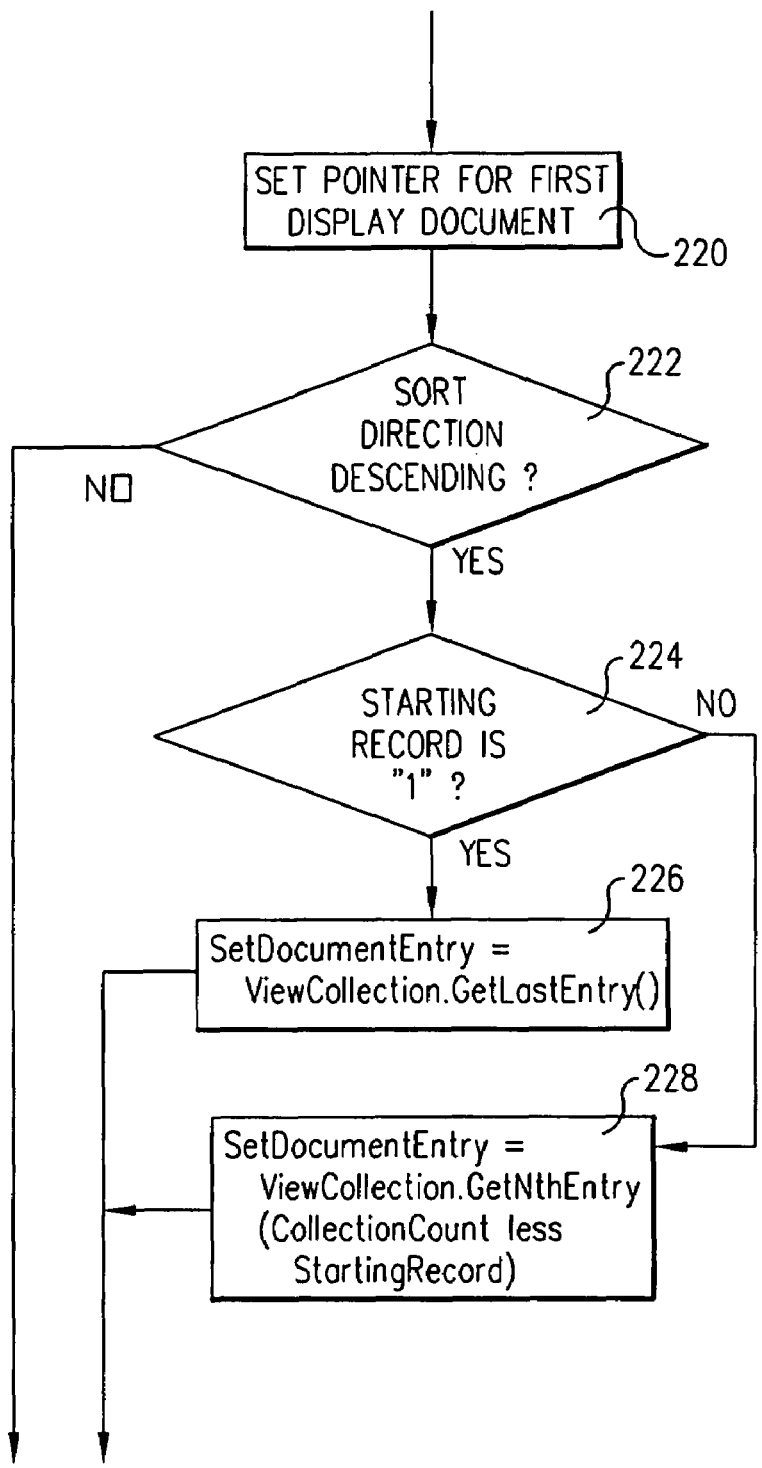
Figure 12C:
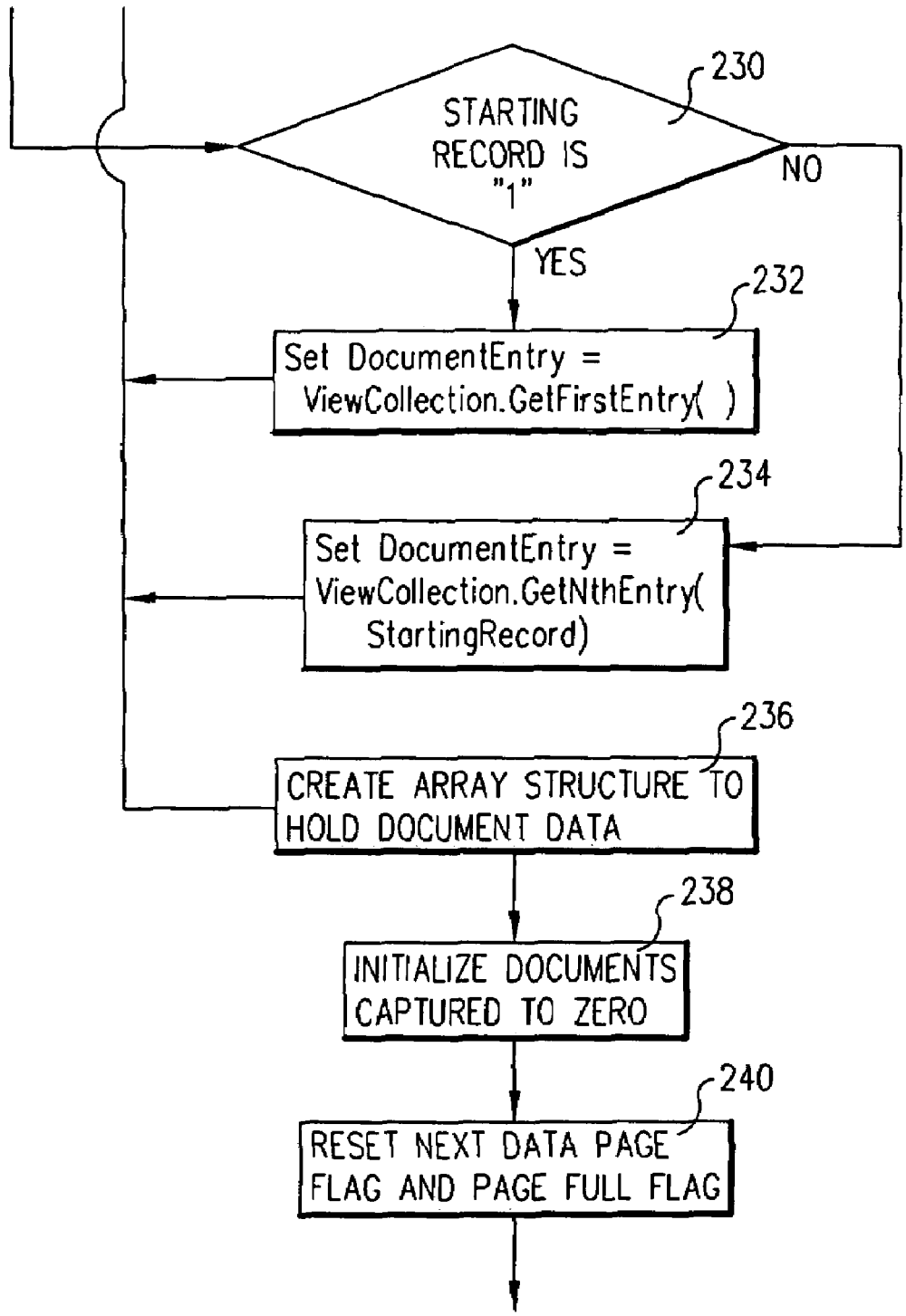
Figure 12D:
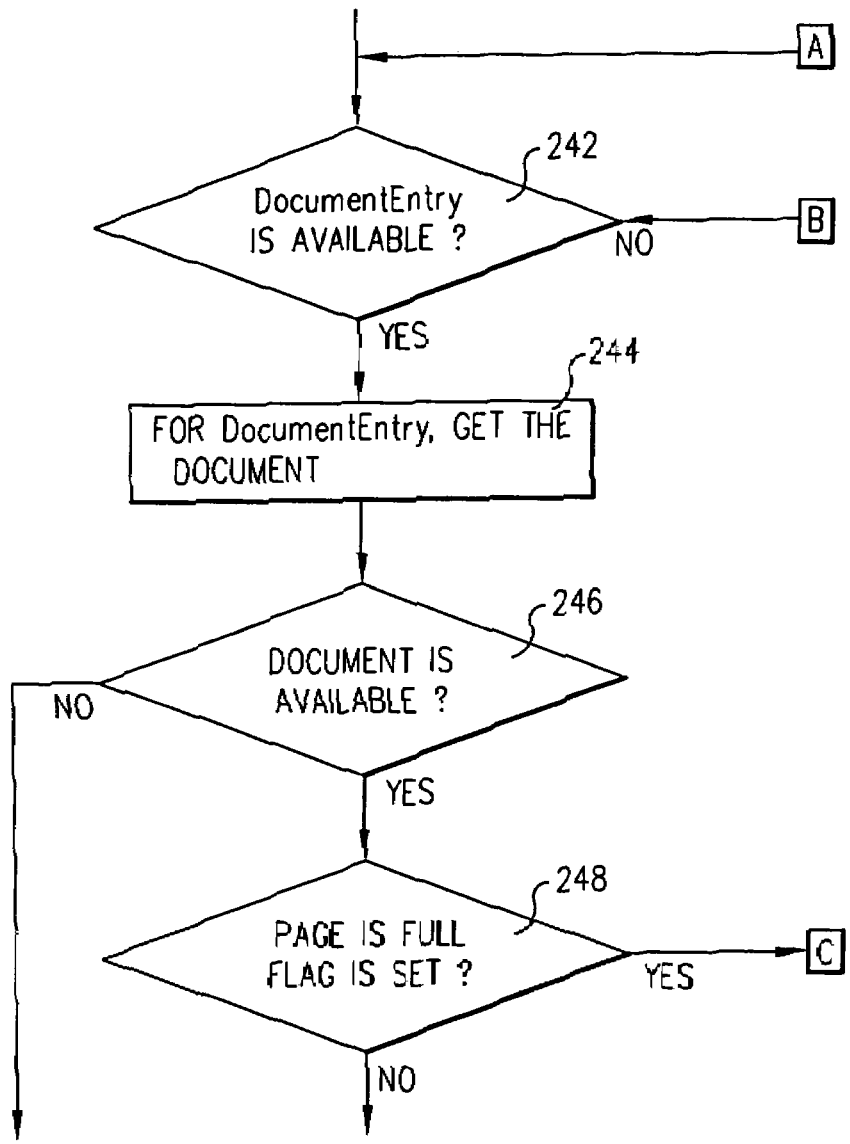
Figure 12E:
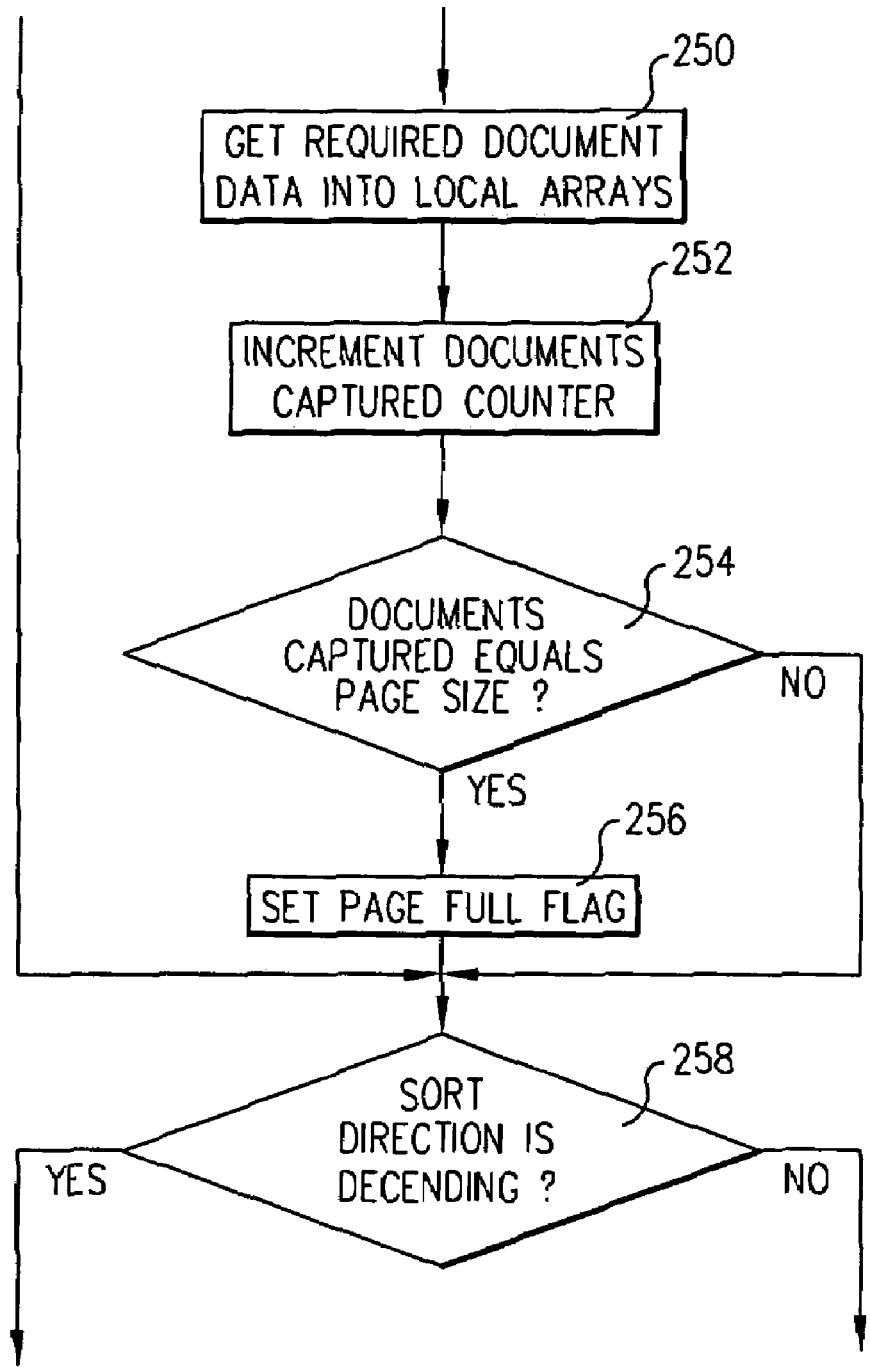
Figure 12F:
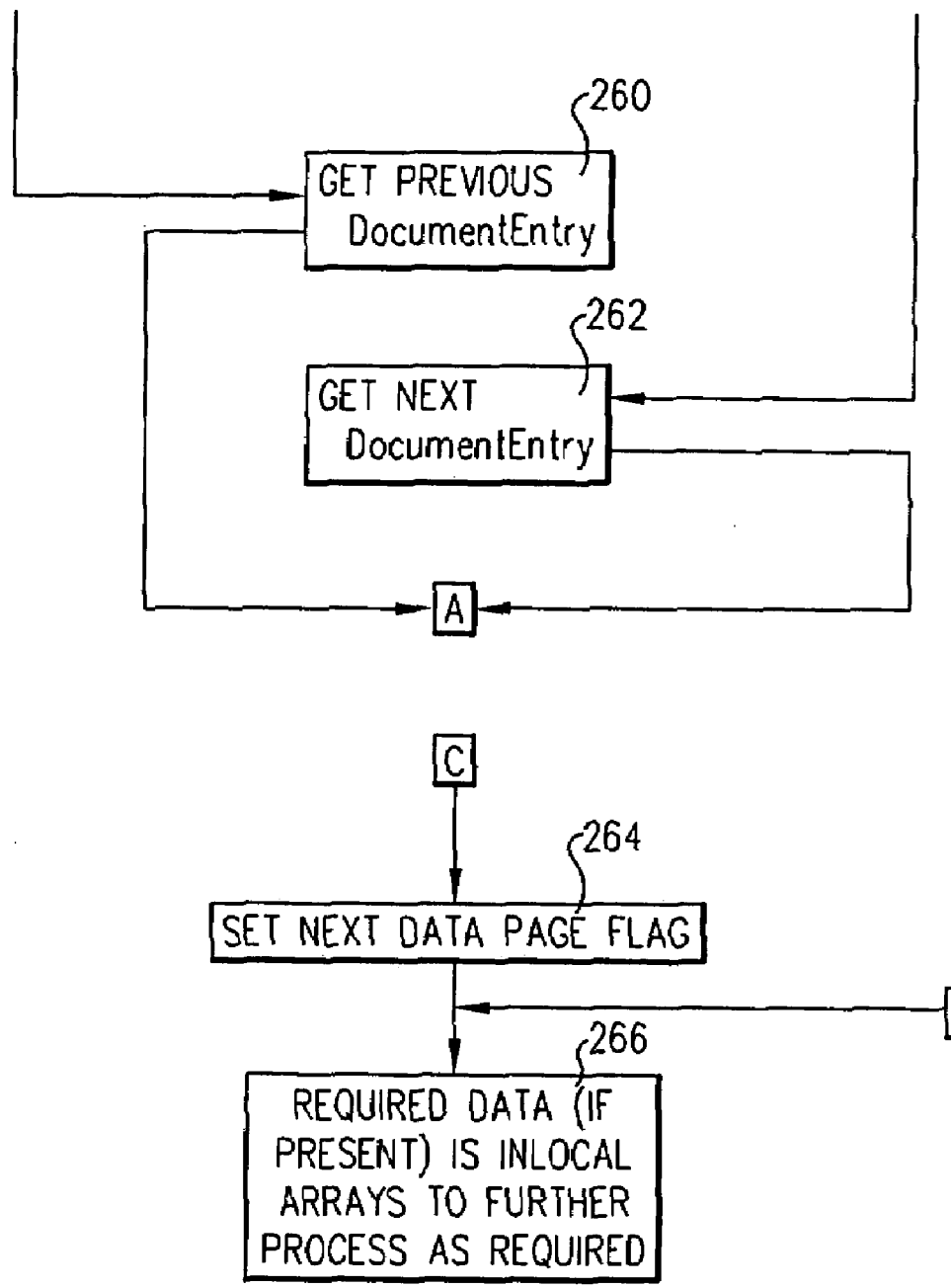

Referring to FIGS. 9 and 10, concatenation of data fields 54, 56 for nested sorting in accordance with an alternative embodiment of the invention is illustrated. In order to post back to the user a view in which a plurality of columns 54, 56 are sorted in nested fashion, a prefix value 76 may be appended to a concatenation of that plurality of columns 54, 56, and then sorted as above along with column keys 78, 144 and data 58, 146, respectively, into second compound column 142 of specialized view 140. Rows 138 illustrated the sorted concatenated data values.

Referring to FIGS. 11 and 12A through 12F in connection with FIG. 7 and Table 1, an exemplary embodiment of the invention is illustrated by pseudo code and flow charts. As used in Table 1, a Notes session is the root of the Domino Objects containment hierarchy, providing access to the other Domino objects, and represents the Domino environment of the current program. A specific view is a named Notes view. A view entry collection represents a collection of view entries, selected according to specific criteria. This class mainly provides a collection of documents in a view-sorted order. In the agent, document information is being collected. How many documents this is done for depends on a page size. The agent is filling this space/page with document data-therefore the reference to a data page. A local array is a data structure local to the processing agent to serve as the collection area for the view data of interest. Notes agents are stand-alone programs that perform a specific task in one or more databases. In steps 220, 222, the "specific method" refers to GetLastEntry and GetFirstEntry versus GetNthEntry. The document entry in step 244 refers to a Notes View Entry, and represents a view entry. A view entry represents a row in a view. In this case, row reflects a Notes Document. For a Notes View Entry, the underlying document may be accessed via the property "Document" of the Notes View Entry. Thus, the document referred to in step 246 corresponds to a line of data from the view. At step 266, the needed data has been captured into local arrays. It is expected that the code following this point will format the data and present it to a Web page.

TABLE 1

PSEUDO CODE REPRESENTATION OF AN ALGORITHM FOR MULTICOLUMN SORTING IN ONE COLUMN

Step 202: Define a Notes Session.
Step 204: For the Notes Session, define a Notes Database link to the current database.
Step 206: Define a Notes View to a specific view in the current database.
   View 100 has 2 sorted columns 42, 94.
     First column 42 is multivalued - represents unique document owners (in this case, Bill)
     Second column 94 is multivalued - all data has been converted in the document to character appropriately padded on the front to allow for correct sorting alignments within the second column 94, every value is uniquely prefixed with a column number 64 followed by a colon 96:
       01:yyyy/mm/dd   (date)
       02:$$$$$$$$$$   (dollar value front padded TABLE 1-continued

PSEUDO CODE REPRESENTATION OF AN ALGORITHM FOR
MULTICOLUMN SORTING IN ONE COLUMN

```
                      with zeros to maximum $ value)
    03:nnnnnnnnn      (number front padded with
                      zeros to maximum size)
    04:text
The view 100 is defined to break up these multivalued
    entities into separate view rows.
Thus, a multicolumn, bidirectional (done with programming)
sort is provided in a single column 94. The algorithm below
extracts the required data from the view 100.
Step 210: Get the input parameters: sort direction, column
index, desired page number, page size, and owner.
Step 212: Based on page size and desired page number,
compute starting record number.
Step 214: Define keys to restrict view.
    First key 42 is full key representing one of the
    document owners (in this example: Bill).
    Second key is a partial one having the prefix 64
    corresponding to the column of interest (e.g. "02")
    (colon 96 is used in prefix 64 to distinguish it from
    remainder of column data 98)
Step 216: Define a View entry collection using defined keys
42, 64. Resulting view entry collection is a restricted
list 100 where the owner matches one of the owners (e.g.,
Bill), sorted on the indicated column 94).
Step 218: Note the View entry collection result count (In
this example, 15, the number of rows sorted on key 02 in
FIG. 5).
Step 220: Based on direction and starting row, set pointer
for first display document.
    (If at top or bottom of collection, quicker to use
    specific method rather than getting Nth entry.)
Step 222: If (Sort Direction is descending) Then
    Step 224: If (Starting Record is 1) Then ' First or
    bottom entry 106 in collection
        Step 226: Set DocumentEntry =
        ViewCollection.GetLastEntry( )
    Else ' Middle of collection 104 / reverse order
        Step 228: Set DocumentEntry =
        ViewCollection.GetNthEntry( CollectionCount less
        StartingRecord )
    End If
Else ' Sort Direction is ascending
    Step 230: If (Starting Record is 1) Then ' First or top
    entry 102 in collection
        Step 232: Set DocumentEntry =
        ViewCollection.GetFirstEntry( )
    Else ' Middle 104 of collection
        Step 234: Set DocumentEntry =
        ViewCollection.GetNthEntry( StartingRecord )
    End If
End If
Step 236: Create array structure to hold required document
data.
Step 238: Initialize documents captured to zero.
Step 240: Reset the next data page flag.
Step 240: Reset the page full flag.
Steps 242-264: Do While (DocumentEntry Is Available) ' If
we have a DocumentEntry to look at, start the look
    Step 244: For the DocumentEntry, get the Document.
    Step 246: If (Document is available) Then
        Step 248: If (Page full flag is set, then
        document represents start of another data page)
        Then
            Step 264: Set next data page flag to
            indicate that there is more data after this
            page
            Exit Do
        End If
        Step 250: Get required document data into local
        arrays for later presentation
        Step 252: Increment counter of documents captured
        for current data page.
        Step 254: If (Documents captured equals the page
        size) Then
            Step 256: Set page full flag
        End If
```

TABLE 1-continued

PSEUDO CODE REPRESENTATION OF AN ALGORITHM FOR
MULTICOLUMN SORTING IN ONE COLUMN

```
        End If
        Based on sort direction, get the next DocumentEntry
        Step 258: If (Sort Direction is Descending) Then
            Step 260: Get Previous DocumentEntry
        Else
            Step 262: Get Next DocumentEntry
        End If
    Loop
    Step 266: Required data (if present) is in local arrays to
    further process as required.
```

By sorting on two columns 42, 84, when view restrictions are applied, a view 100 is presented which in a first step includes only a specified person's (Bill) data. In a second step, a Notes agent ripples through the clustered data to pull off what is needed to present to the user a view of his data in sorted order. The key 64 applied to the data values 98 collapses multiple columns 50-58 into one column 94.

In accordance with the preferred embodiment of the invention, one database is conceptualized. However, it may be implemented with N databases, in which case it would only be required to keep track of a next record to retrieve based on the largest (or smallest) record remaining in the N databases.

Advantages over the Prior Art

It is an advantage of the invention that there is provided an improved system and method for sorting on multiple columns when multiple column sort capability is not available or efficient.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A computer implemented method for improved server performance in response to a query request by presenting to a user a set of documents in an embedded view derived by multicolumn sorting in one column of a table including at least one category column and a plurality of data columns in a digital storage device, comprising:

ordering a first category column of said at least one category column in a first compound column, wherein each category column comprises a plurality of categories in a plurality of row entries, wherein the plurality of categories in each category column is specific to each category column, wherein each row entry in each category column consists of one category of the plurality of categories specific to each category column, wherein each category entry in a row entry of the first compound column comprises a category in a row entry of the first category column, and wherein the table comprises a document identifier column such that each row entry of the document identifier column identifies a document to which the user navigates;

converting, by a processor, non-character data values in said data columns to character format;

selecting N data columns of the plurality of data columns, N being at least 2;

determining a second compound column comprising all data values in the N data columns, wherein each row entry of the second compound column is a concatenation of a column key, a delimiter, and a data set, wherein the delimiter is a constant character disposed between the column key and the data set, wherein the column key identifies a column set selected from the group consisting of a single data column of the N data columns and a concatenation of two or more data columns of the N data columns, and wherein the data set includes either a single data value in a unique row of the single data column identified by the column key if the column set is the single data column or a multiple data value consisting of a concatenation of the data values in the two more data columns in a unique row of the two more data columns if the column set is the concatenation of the two more data columns identified by the column key;

defining a primary key on said first compound column and a column key on said second compound column;

collecting into an embedded view to said user a subset of said table, wherein the embedded view comprises the first compound column and the second compound column sorted according to a multiple key sort in which the first compound column is sorted in accordance with the primary key functioning as a primary sort key of the multiple key sort and the second compound column is sorted in accordance with the column key functioning as a secondary sort key of the multiple key sort, and wherein the second compound column in the embedded view depicts data values of each data column of the N data columns appearing sorted in ascending or descending order for each category entry in the first compound column; and navigating to a document selected by said user from said embedded view, wherein the selected document is identified by a document identifier in the document identifier column.

2. The method of claim 1, further comprising ordering a second category column of the at least one category column in said first compound column, wherein each category entry in a row entry of the first compound column further comprises a category in a row entry of the second category column.

3. The method of claim 1, wherein the column set identified by the column key in each set of row entries of a plurality of sets of row entries consists of a single data column specific to each set of row entries.

4. The method of claim 1, wherein the column set identified by the column key in a first set of row entries of the second compound column consists of a single data column specific to the first set of row entries, and wherein the column set identified by the column key in a second set of row entries of the second compound column consists of a concatenation of two or more data columns specific to the second set of row entries.

5. The method of claim 1, wherein N=3.

6. The method of claim 1, wherein N=4.

* * * * *